Oct. 18, 1966  W. B. KIRK, JR ETAL  3,279,537
PROCESS FOR RECOVERING OIL UTILIZING NON-NEWTONIAN FLUIDS
Filed Jan. 10, 1964

INVENTORS
WALTER B. KIRK, JR.
WILSON L. KINNEY
WILLIAM B. GOGARTY
BY
ATTORNEY

United States Patent Office 3,279,537
Patented Oct. 18, 1966

3,279,537
PROCESS FOR RECOVERING OIL UTILIZING
NON-NEWTONIAN FLUIDS
Walter B. Kirk, Jr., and Wilson L. Kinney, Terre Haute, Ind., and William B. Gogarty, Littleton, Colo., assignors to Marathon Oil Company, Findlay, Ohio, a corporation of Ohio
Filed Jan. 10, 1964, Ser. No. 337,015
15 Claims. (Cl. 166—9)

This invention relates to the injection and flow of pseudoplastic non-Newtonian fluids in oil-bearing formations, and more particularly to a process for intermittent reduction and subsequent increase in pumping pressures in the injection and driving of non-Newtonian fluids into and through subterranean oil-bearing formations.

One "bank" method of flooding uses a slug of thickened material followed by a slug of a driving material such as water. The thickening materials are usually long chain polymers such as carboxylmethyl cellulose or polyacrylic acid in water solution. These materials give the solutions pseudoplastic non-Newtonian viscosity characteristics.

Non-Newtonian fluids are complex solutions that sometimes exhibit colloidal tendencies. Non-Newtonian solutions or mixtures do not show a linear relationship between shear rate and shear stress, i.e., the apparent viscosity of the liquid decreases wth increasing shear stress. Aqueous solutions of copolymers of vinyl compounds with ethylene, styrene, maleic anhydride (United States Patent 3,070,158) and polyvinyl toluene sulfonates, polystyrene sulfonates, or substituted polystyrene sulfonates (United States Patent 3,085,063) are other examples of materials which exhibit pseudoplastic non-Newtonian characteristics in reservoirs.

The injection rate of most fluids utilized in petroleum recovery from subterranean formations to date has been relatively uniform. One exception has been the use of high cyclic injection rates to increase production by use of the principle of imbibition in a fractured oil-bearing formation (A.I.M.E., S.P.E. Journal of Petroleum Technology, vol. XV, No. 8, pp. 877–84, August 1963). This process is in no way related to our method of flooding because the principle used in our method is that of increased pressure differential across a non-Newtonian fluid.

We have now discovered that when at least one slug of a material exhibiting non-Newtonian flow properties in a reservoir is injected into a formation and thereafter injection pressures are intermittently reduced and subsequently instantaneously increased, the flow of the non-Newtonian fluid through the reservoir causes a great increase in fluid productivity at a production well. Our preferred method uses a bank having at least one slug of a material exhibiting pseudoplastic non-Newtonian flow properties in the reservoir with substantially coincident drawdown of recovery wells. A portion of the injected fluids, preferably the drive fluid, can be Newtonian in character.

The apparent viscosity of a pseudoplastic non-Newtonian fluid flowing in a porous medium increases as flow decreases. Apparent viscosity, stated another way, is the ratio of shear stress to rate of shear, the shear stress exhibited by the fluid being the result of the particular rate of shear.

The following figures and theoretical explanations aid in understanding this invention and the phenomenon underlying the invention.

Figure 3:
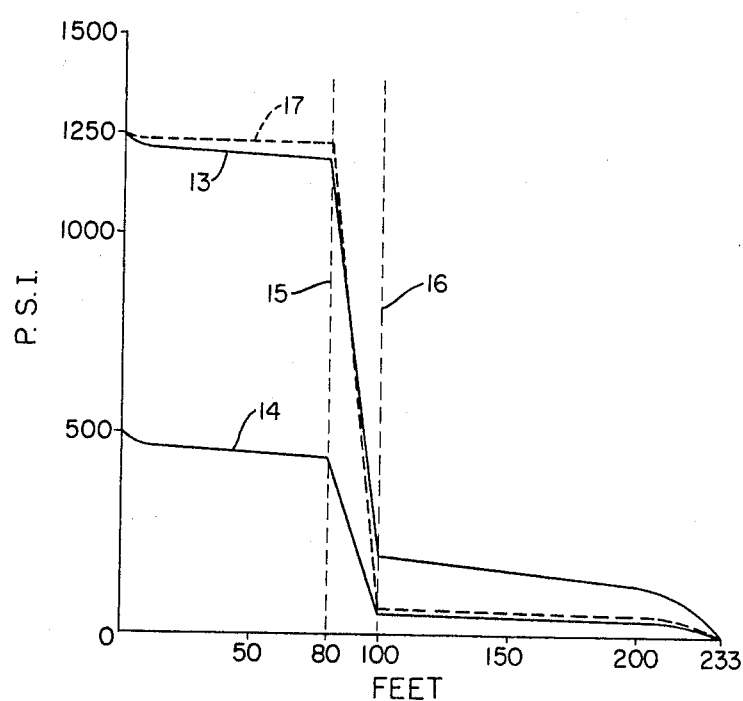

FIGURE 3 depicts typical pressure curves between an injection well at 0 feet and a production well at about 233 feet where the slug of non-Newtonian fluid is situated between 80 and 100 feet from the injection well.

Figure 1:
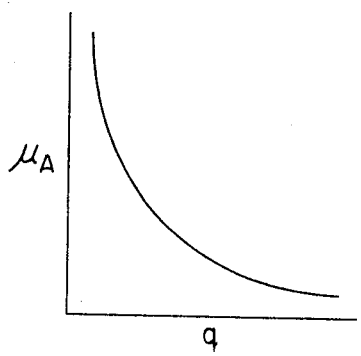
FIGURE 1 depicts the relationship between apparent viscosity, $\mu_a$, and the rate of flow, $q$ in a pseudoplastic non-Newtonian fluid.
Figure 2:
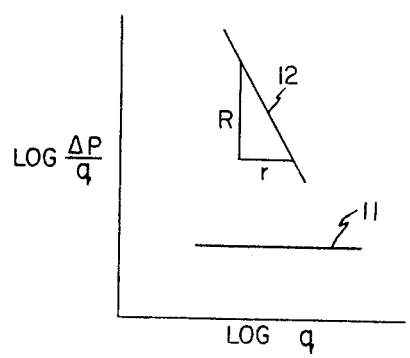
FIGURE 2 shows an experimentally derived relationship between the logarithm of the difference in pressure across a linear porous medium divided by the rate of flow, $\Delta P/q$, and the rate of flow, $q$.

A graph of the log of pressure difference in a porous medium divded by the rate of fluid flow versus the log of the rate of fluid flow, represented by FIG. 2, shows Newtonian fluid flow as a straight horizontal line 11 and non-Newtonian fluid flow as a straight inclined line 12 where the distance through the porous medium, permeability, cross-sectional area of the porous medium, etc., are constant. Horizontal line 11 is the expected result of Darcy's law. Solution of the equation of inclined line 12, as follows, gives us the following equation:

$$q = C \Delta P^n$$

where $q$=rate of flow, $C$=constant, $\Delta P$=pressure difference, and $n$=the exponent arising out of the character of the injected fluid. In Newtonian fluids $n=1$, while in non-Newtonian fluids $n=>1$.

From graph 2, it is evident that in formulating an equation for the sloped line that $$\log \frac{\Delta P}{q} = N \log q + \log C'$$

where $\Delta P$=pressure difference across core, $q$=flow, $N$=slope of line, i.e., $R/r$ (denoted at FIG. 2), and $C'$=constant.

By using the laws of logarithms, we can say $$\frac{\Delta P}{q} = C' q^N$$

This expression can be converted to $$\Delta P = C' q^{N+1}$$

or $$q = C \Delta P^n$$

where C is a different constant than C' and $$n = \frac{1}{1+N}$$

From this relationship, it is evident that an increase in $\Delta P$ will increase the volumetric flow rate, $q$, exponentially. Therefore, at equal initial apparent viscosities and injection pressures, proportionately larger changes in flow rate can be obtained for non-Newtonian fluids.

The improved results obtained by the process of this invention are explainable in terms of the idealized curves of FIG. 3. The curves are drawn in terms of the distance between an injection well and a production well on a 2.5 acre regular isolated five-spot pattern wherein fluid is injected into the four areally external wells of the five-spot pattern and oil is continuously pumped from the central well.

In considering the curves, it must be remembered that the apparent viscosity will increase rapidly with decreasing rate of movement of the pseudoplastic non-Newtonian fluid through the formation. Thus, if fluid injection is stopped, the apparent viscosity of the non-Newtonian fluid in the formation will increase as the flow rate decreases.

Curves 13, 14, and 17 depict the pressure profile within a formation where a pseudoplastic non-Newtonian bank is located between lines 15 and 16. Curve 13 indicates the pressure profile across the bank at a constant, i.e., "steady state," injection pressure of about 1,250 p.s.i. Curve 14 depicts the pressure profile after injection of fluids has been discontinued two or three days previously.

Curve 17 depicts the pressure profile after injection of a Newtonian fluid, such as water, is resumed at 1,250 p.s.i. pressure.

It is seen that normally during "steady state" operation the pressure difference across the bank will be 1,000 p.s.i. while the pressure drop across the bank, after reinjection, is about 1,200 p.s.i. due to continued drawdown. This greater pressure difference causes a greater shear and, as a result, a reduced viscosity which, in turn, leads to greater rate of flow.

The initial increase in pressure across the bank causes an increase in flow at the production well which decreases as further transients develop in the formation. However, the flow rate will, for a period of time, remain higher than the previous steady state flow rate.

The following example more illustrates our invention, but it is not intended that the invention be limited to the conditions or materials of the example. Rather, it is intended that all equivalents obvious to those skilled in the art be included in the scope of our invention as claimed.

*Example I*

A slug, comprising 3% of the pore volume of a formation, of a soluble oil is injected into the four injection wells of an isolated regular five-spot pattern drilled into a 10-foot thick producing sandstone located at a depth of 950 feet. The soluble oil is composed of 24%, by volume, water; 61.1% straight run gasoline; 11.1% of a refined alkylnaphthenic monosulfonate purchased from Shell Oil Company; and 3.8% isopropanol. Well spacing is 2.5 acres. Formation has a permeability of 150 md. and a porosity of 19–21%. The initial oil saturation of the formation is 50–55%, and water saturation is 23–27%. Gas and voids account for 18–27% of the pore volume. Crude viscosity is about 11.5 cp. at 21° C.

The oil-external slug is followed by a slug of water-external emulsion in an amount equivalent to about 3% of the pore volume, having a composition (by volume) of 60.0% water; 32.2% straight run gasoline; 5.8% alkylnaphthenic monosulfonate; and 2.0% isopropanol. The above two slugs have an apparent viscosity of approximately that of crude in the formation, as measured by a Brookfield viscometer. After injection of the soluble oil and emulsion is complete and water injection is initiated, injection is stopped for two days. During this period, the center production well of the five-spot is continuously drawn down. After draw down of pressure in the formation surrounding the center well is substantially complete, injection is resumed at the rate of about 300 b.p.d. at a wellhead pressure of 800–900 p.s.i. Prior to interruption of injection, maximum injectivity is only about 160 b.p.d. As frontal velocity is related to volume of fluid injected, the velocity of the perimeter of injected fluid toward the production well is increased and, therefore, recovery rates increase.

Now having described our invention, what we claim is:

1. In a process for the recovery of petroleum fluids from permeable subterranean formation having at least one injection well and one production well drilled therein wherein a fluid having pseudoplastic non-Newtonian characteristics in the reservoir is injected into the said formation through at least one injection well, the said fluid is propelled through the said formation by the further injection of fluid, and formation fluids are produced through at least one production well, the steps comprising periodically, after injection of at least a portion of the fluid exhibiting pseudoplastic non-Newtonian characteristics, decreasing injection pressures and, after pressure reduction, rapidly increasing the injection pressures.

2. The process of claim 1 comprising continuously producing oil through the production well(s).

3. The process of claim 1 comprising reducing injection pressures to substantially zero, while fluid recovery is continued at the production well(s).

4. In an oil recovery process wherein a bank of fluid, including at least one slug of a non-Newtonian fluid, is propelled by fluid pressure through a subterranean oil-bearing formation from at least one injection well drilled into said formation to at least one production well drilled into said formation, the steps comprising cyclically reducing and rapidly increasing the injection fluid pressure acting on the bank of fluid and producing oil from said at least one production well.

5. The process of claim 4 comprising maintaining drawdown at the production well(s) substantially coincident with the reduction of injected fluid pressures.

6. The process of claim 5 comprising reducing the injected fluid pressure to substantially zero.

7. The process comprising injecting into a subterranean permeable oil-bearing formation, through a portion of a plurality of wells drilled therein, at least one fluid having pseudoplastic non-Newtonian viscosity characteristics; thereafter, injecting into said formation through said portion of wells a drive material having Newtonian viscosity characteristics and periodically substantially reducing, thereafter substantially instantly increasing the rate at which the drive material is injected into said formation and producing oil through a second portion of said plurality of wells.

8. The process of claim 7 comprising continuing production from the second portion of the wells drilled into the formation while the Newtonian drive material is injected into the formation at reduced rates.

9. The process of claim 7 comprising reducing substantially to zero the rate at which the drive material is injected into the formation.

10. In a process for the production of petroleum fluids from permeable subterranean formations having a plurality of wells drilled therein comprising injecting a pseudoplastic non-Newtonian fluid into said formation through a portion of the wells drilled therein while periodically reducing, and subsequently increasing, the rate at which the fluid is injected into the formation through said portion of wells and producing oil through a second portion of said plurality of wells.

11. The process of claim 10 comprising maintaining negative pressures on the remaining portion of wells drilled into said formation.

12. The process of claim 10 comprising reducing substantially to zero the rate at which the fluid is injected into the formation.

13. The process of claim 10 comprising reducing substantially to zero the rate at which the fluid is injected into the formation while continuously producing oil from the remaining portion of the wells drilled into said formation.

14. In a process for the recovery of petroleum fluids from permeable subterranean petroleum-bearing formations wherein a pseudoplastic non-Newtonian fluid is injected into the said formation through a plurality of wells areally external to a production well, the steps comprising periodically reducing, and subsequently increasing, the rate at which the fluid is injected into the external wells through the plurality of wells areally external to the said production well and recovering oil through said production well.

15. In a process for the recovery of petroleum fluids from permeable subterranean petroleum-bearing formations wherein a pseudoplastic non-Newtonian fluid is injected into a row of injection wells drilled into said petroleum-bearing formation and petroleum fluids are recovered through an adjacent row of wells drilled into said petroleum-bearing formation, the steps comprising periodically reducing, and subsequently increasing the rate at which the fluid is injected into the formation through said row of injection wells and recovering oil through said production well.

(References on following page)

References Cited by the Examiner

UNITED STATES PATENTS

| | | | |
|---|---|---|---|
| 2,421,528 | 6/1947 | Steffen | 166—40 |
| 2,771,138 | 11/1956 | Beeson | 166—9 |
| 3,070,158 | 12/1962 | Roper et al. | 166—9 |
| 3,085,063 | 4/1963 | Turbak | 166—9 X |
| 3,208,515 | 9/1965 | Meadors | 166—9 |

OTHER REFERENCES

Journal of Petroleum Technology, August 1963, vol. XV, No. 8 (TN 860 J6) (pp. 877–884).

CHARLES E. O'CONNELL, *Primary Examiner.*

J. L. NACKENOFF, *Examiner.*

S. J. NOVOSAD, *Assistant Examiner.*